(12) United States Patent
Ham

(10) Patent No.: US 7,737,613 B2
(45) Date of Patent: Jun. 15, 2010

(54) ELECTRODELESS LAMP AND CORE HAVING INDENTED COIL WINDING SECTION FOR USE WITH TUBULAR LAMP ENVELOPE

(75) Inventor: Byung Il Ham, Rancho Pales Verdes, CA (US)

(73) Assignee: U.S. Energy Technologies, Inc., Irvine, CA (US)

( * ) Notice: Subject to any disclaimer, the term of this patent is extended or adjusted under 35 U.S.C. 154(b) by 312 days.

(21) Appl. No.: 11/888,262

(22) Filed: Jul. 31, 2007

(65) Prior Publication Data

US 2009/0033240 A1 Feb. 5, 2009

(51) Int. Cl.
*H01J 1/50* (2006.01)
*H01J 11/00* (2006.01)
*H01J 61/30* (2006.01)
*H05B 41/24* (2006.01)

(52) U.S. Cl. .............. 313/161; 313/493; 313/567; 313/573; 313/634; 315/248; 315/344

(58) Field of Classification Search ........... 313/231.01, 313/567, 573, 634, 155, 161; 315/248, 344
See application file for complete search history.

(56) References Cited

U.S. PATENT DOCUMENTS

| | | | | |
|---|---|---|---|---|
| 3,246,192 A | * | 4/1966 | Torsch | 313/431 |
| 4,705,987 A | * | 11/1987 | Johnson | 313/634 |
| 5,834,905 A | * | 11/1998 | Godyak et al. | 315/248 |
| 6,175,197 B1 | * | 1/2001 | Kling | 315/248 |

* cited by examiner

*Primary Examiner*—Karabi Guharay
*Assistant Examiner*—Sheryl Hull
(74) *Attorney, Agent, or Firm*—Sheppard Mullin Richter & Hampton LLP

(57) ABSTRACT

An electrodeless lamp assembly includes a tubular lamp envelope, at least one core having a closed-loop body disposed so as to surround a core mounting portion of the tubular lamp envelope. The core includes an indented coil winding section formed by an indentation formed in an inner side section of the closed-loop body adjacent to a centrally located opening. The electrodeless lamp assembly further includes an induction coil wound around the indented coil winding section of the core.

23 Claims, 5 Drawing Sheets

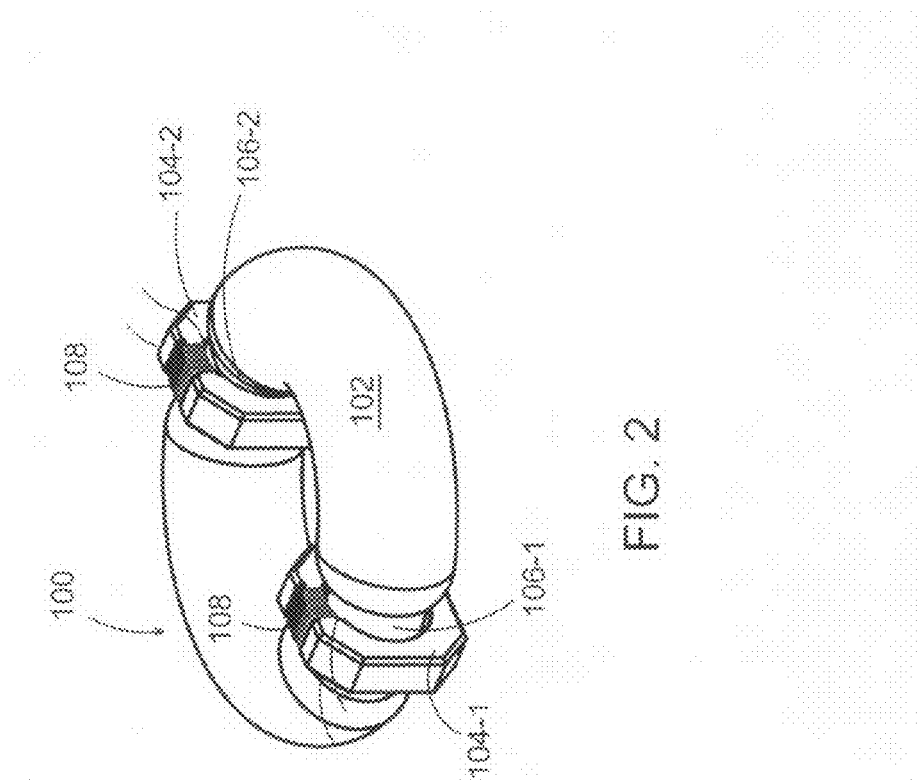
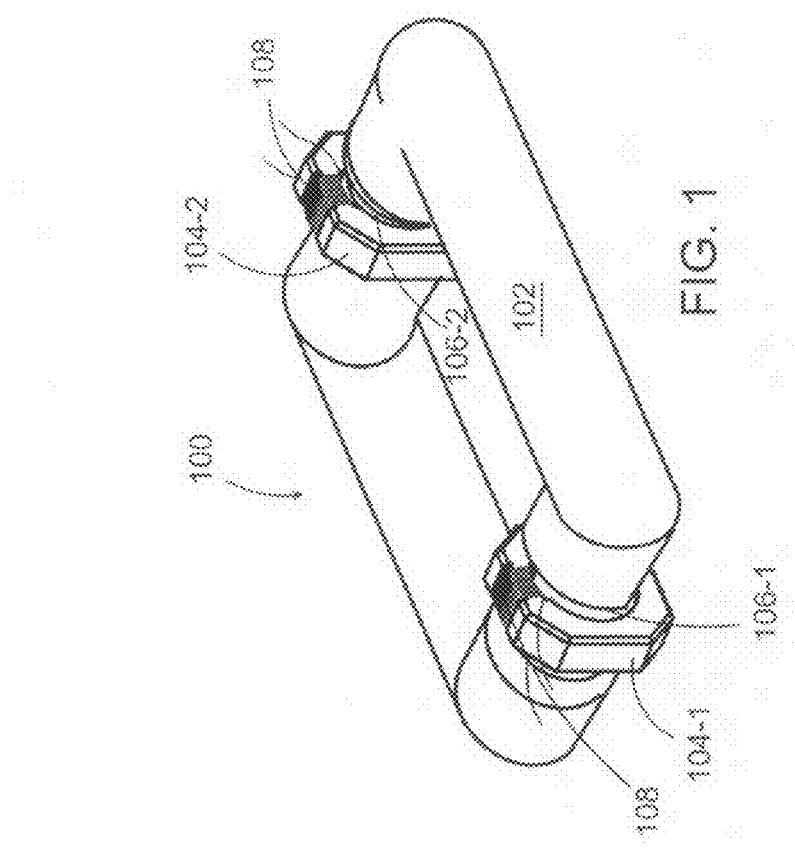

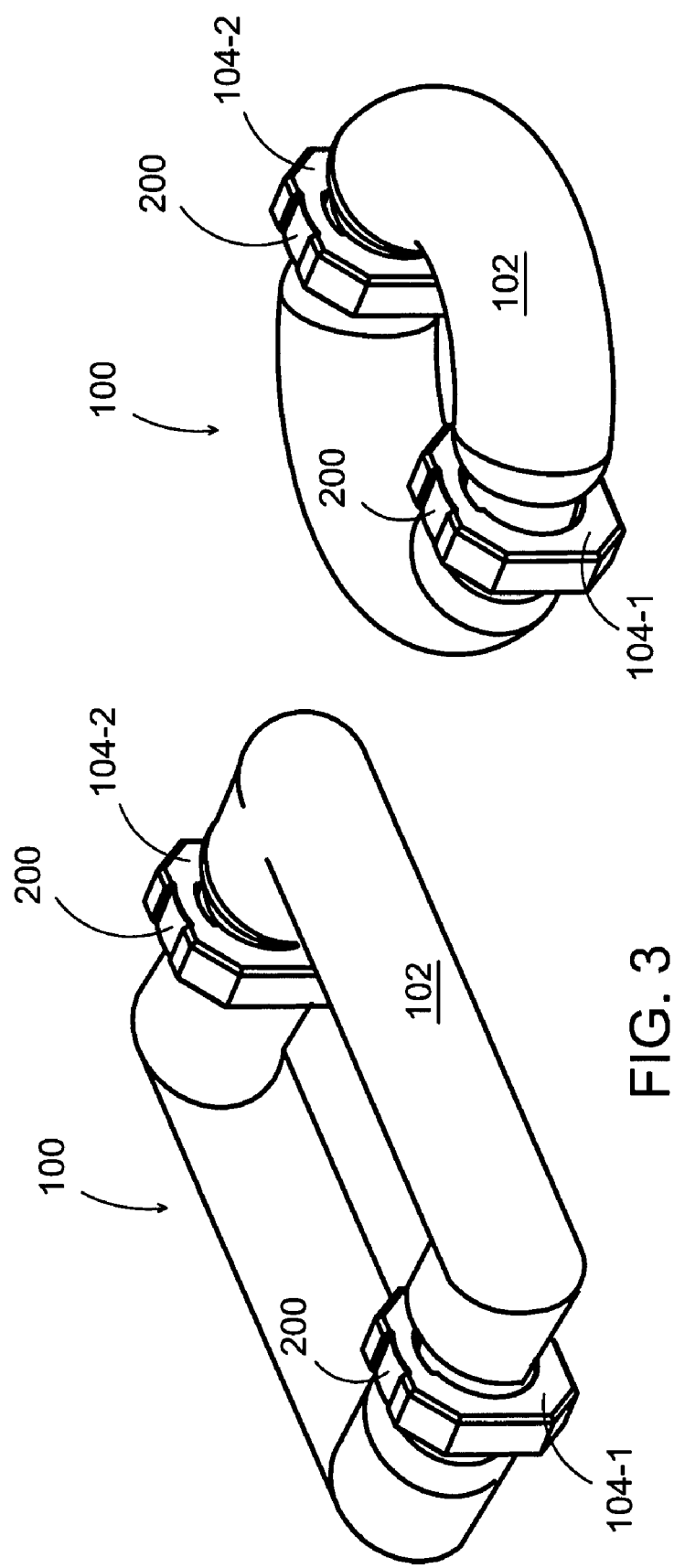

ELECTRODELESS LAMP AND CORE HAVING INDENTED COIL WINDING SECTION FOR USE WITH TUBULAR LAMP ENVELOPE

BACKGROUND OF THE INVENTION

1. Field of the Invention

The present invention generally relates to electrodeless lamps, and more particularly, to configurations of cores surrounding lamp envelopes of electrodeless lamps.

2. Description of the Related Art

Various types of electrode lamps are available that have lamp electrodes disposed within a lamp envelope to deliver electrical power to the lamp. For example, in electrode type fluorescent lamps and incandescent lamps, electrical power is delivered to a lamp through electrical power flowing between the lamp electrodes.

Recently, there have been introduced various types of electrodeless lamps that do not require electrodes disposed within the lamp envelope. One of the advantages of not using electrodes in electrodeless type lamps is that the life of the lamp can be substantially extended since the use of an electrode is a major factor in limiting the life of electrode type lamps.

BRIEF SUMMARY OF EMBODIMENTS THE INVENTION

Described herein are various embodiments of an electrodeless lamp assembly that includes a tubular lamp envelope and at least one core having a closed-loop body disposed so as to surround a core mounting portion of the lamp envelope. The core includes an indented coil winding section defined by at least a lower indented portion. An induction coil is wound around the indented coil winding section of the core.

According to an aspect of an embodiment, the coil winding section of the core is defined by at least a lower indented portion. And, the lower indented portion of the coil winding section is configured such that an insulating layer of the induction coil is prevented from making direct contact with the tubular lamp envelope when the core with the induction coil wound around the indented coil winding section is mounted on the tubular lamp envelope.

According to another aspect of an embodiment, the indented coil winding section of the core is defined by at least a lower indented portion. And, the lower indented portion of the coil winding section is sized to retain the induction coil wound around the perimeter thereof such that an outer-most edge of the coil winding does not extend beyond an edge defined by a centrally located opening of the core.

According to a further aspect of the present invention, an embodiment is directed to a core for use with a tubular electrodeless lamp envelope. The core includes a closed-loop body having a centrally located opening to surround a portion of the tubular lamp envelope. The closed-loop body of the core has an indented coil winding section defined by at least a lower indented portion. The lower indented portion is formed by an indentation formed in an inner side section adjacent to the centrally located opening. The indented coil winding section may further be defined by an upper indented portion formed by an indentation formed in an outer periphery section of the core body opposite the lower indented portion.

BRIEF DESCRIPTION OF THE DRAWINGS

Embodiments of the invention are illustrated by way of example and not by way of limitation in the figures of the accompanying drawings in which like references indicate similar elements. It should be noted that the references to "an embodiment" or "one embodiment" of this disclosure are not necessarily to the same embodiment, and such references mean at least one.

FIG. 1 is a diagrammatic perspective view of a lamp envelope assembly of an electrodeless lamp system according to an embodiment of the present invention.

FIG. 2 is a diagrammatic perspective view of a lamp envelope assembly according to another embodiment of the present invention.

FIG. 3 is a diagrammatic perspective view of the lamp envelope assembly shown in FIG. 1 without the induction coil.

FIG. 4 is a diagrammatic perspective view of the lamp envelope assembly shown in FIG. 2 without the induction coil.

FIG. 5B is a diagrammatic perspective view a ferrite core according to an embodiment of the present invention.

DETAILED DESCRIPTION OF THE INVENTION

Figure 5A:
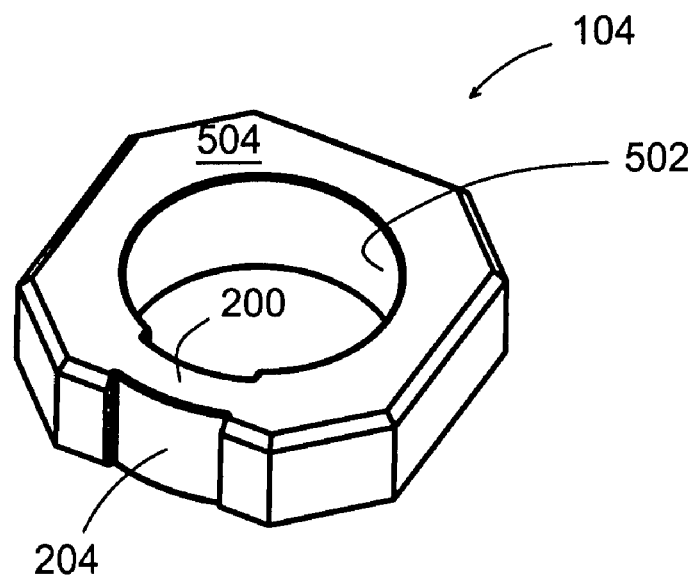
FIGS. 5A and 5B are diagrammatic perspective views a ferrite core according to an embodiment of the present invention, depicting a first planar surface and a second planar surface, respectively.

In the following description, specific details are set forth in order to provide a thorough understanding of various embodiments of the present invention. However, it will be apparent to one skilled in the art that embodiments of the present invention may be practiced without these specific details. In other instances, well-known circuits, components, structures and techniques have not been shown in detail in order to avoid obscuring embodiments of the present invention. It should be noted that, as used in the description herein and the claims, the meaning of "in" includes "in" and "on".

FIG. 1 illustrates a lamp envelope assembly 100 of an electrodeless lamp system according to an embodiment of the present invention. The lamp envelope assembly 100 generally includes a tubular lamp envelope 102, a first core 104-1 encircling the lamp envelope at a first core mounting location 106-1, a second core 104-2 encircling the lamp envelope at a second core mounting location 106-2, and an induction coil 108 wound around the cores 104. In an embodiment, the tubular lamp envelope 102 is shaped in a closed loop and contains a medium (e.g., argon gas, krypton gas, mercury vapor, etc) capable of generating ultraviolet (UV) radiation. The tubular lamp envelope 102 may include a layer of phosphors disposed on the inner surface thereof to convert the UV radiation into visible light. While the tubular lamp envelope 102 illustrated in FIG. 1 has an overall rectangular shape, the lamp envelope assembly can employ a tubular lamp envelope having any other suitable shape or size, including circular shaped lamp envelope 102 as shown in FIG. 2. FIGS. 3 and 4 show the lamp envelope assemblies of FIGS. 1 and 2 without the induction coils.

The power to generate light is transferred from the outside of the lamp envelope 102 by use of electromagnetic fields. In this regard, the electrodeless lamp system further includes a ballast circuit configured to generate high frequency power (e.g. high frequency current) to drive the induction coil 108 wound around each of the cores 104-1 and 104-2. In operation, the high frequency current generated by the ballast circuit flows through the induction coil 108 wound around the cores 104, producing inductive electromagnetic fields to excite and maintain the interaction between the discharge gas (e.g., electrons, phosphors) contained in the lamp envelope 102.

Each of the cores 104-1, 104-2 has a closed loop configuration that surrounds the lamp envelope 102 at a respective core mounting location 106-1, 106-2. In an embodiment, as shown in FIGS. 1 and 2, each core 104 is located on the two opposite sides of the lamp envelope 102.

Figure 5B:
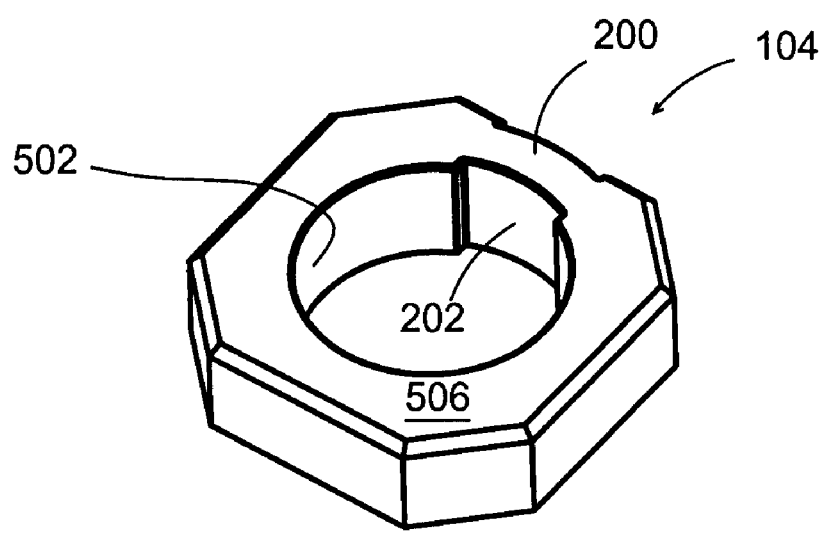

FIGS. 5A and 5B show a core according to an embodiment of the present invention. The illustrated core 104 has a polygonal cross-section (e.g., octagonal cross section) having a centrally located opening 502 (e.g., round opening) through the center axis thereof. In an embodiment, the centrally located opening 502 formed in each of the cores 104 is sized to firmly engage a core mounting location of the lamp envelope 102. It is note that an overall configuration of the core is not limited to the illustrated shapes, but also can be other suitable shapes for surrounding the lamp envelope at the core mounting locations, including a toroidal shape and a donut shape.

In an embodiment, the core 102 is made from ferrite material. The core 102 includes a substantially flat body defined by a first planar surface 504 (shown in FIG. 5A) and a second planar surface 506 (shown in FIG. 5B). The planar surfaces 504, 506 are generally opposed and define the axial width W (shown in FIG. 6B) of the core 104. As noted above, the centrally located opening 502 defines a center axis of the core 102 and is adapted to surround a core mounting location of the lamp envelope 102. It is understood that the diameter of the centrally located opening 502 may vary to accommodate various diameter sizes of lamp envelopes. In an embodiment, the core body comprises two separate parts 602, 604 (shown in FIG. 6A) that can be separately placed over a respective core mounting location of the tubular lamp envelope 102 and mounted together using fasteners or clamping mechanisms.

The opposed planar surfaces 504, 506 or sides terminate at an outer peripheral of the core body. Although the illustrated core 102 shows polygonal-shaped periphery, other suitable peripheral shapes may also be used, including circular shaped periphery.

In accordance with an embodiment, each of the core 104 includes an indented coil winding section 200 formed on the core body. In an embodiment, the indented coil winding section 200 is defined by at least a lower indented portion 202 formed by a first indentation 203 (shown in FIG. 6A) formed in an inner side section adjacent to the centrally located opening 502. As shown in FIG. 5B, the lower indented portion 202 extends between the first planar surface 504 and the second planar surface 506 of the core body. In an embodiment, the indented coil winding section 200 is further defined by an upper indented portion 204 formed by a second indentation 205 (shown in FIG. 6A) formed in an outer peripheral section opposite the lower indented portion 202. As shown in FIG. 5A, the upper indented portion 204 extends between the first planar surface 504 and the second planar surface 506 of the core body. In accordance with an embodiment, the indented coil winding section 200 is adapted to receive an induction coil winding and has a thickness T1 that is smaller than a thickness T2 of a remaining section of the core 104.

In an embodiment, the induction coil 108 comprises an electrically conductive wire (e.g., copper) coated with an insulating material (e.g., plastic coating). The insulating coating of the induction coil is also referred to herein as an insulating layer. As shown in FIGS. 1 and 2, the induction coil 108 is wound around an outer perimeter of the indented coil winding section 200. The coil winding may comprise a single layer of coil winding or a multiple layers of coil winding on the coil winding section 200. As noted above, the induction coil 108 wound around the core 104 supplies power to the lamp envelope 102 by providing inductive magnetic fields inside the core to excite and maintain the interaction between the discharge gas contained in the lamp envelope. In an embodiment, the lower indented portion 202 of the core winding section 200 is shaped (e.g., sufficient depth) such that when the coil 108 is wound around the coil winding section 200, the insulating layer of the coil 108 is prevented from making direct contact with the lamp envelope 102.

Figure 6B:
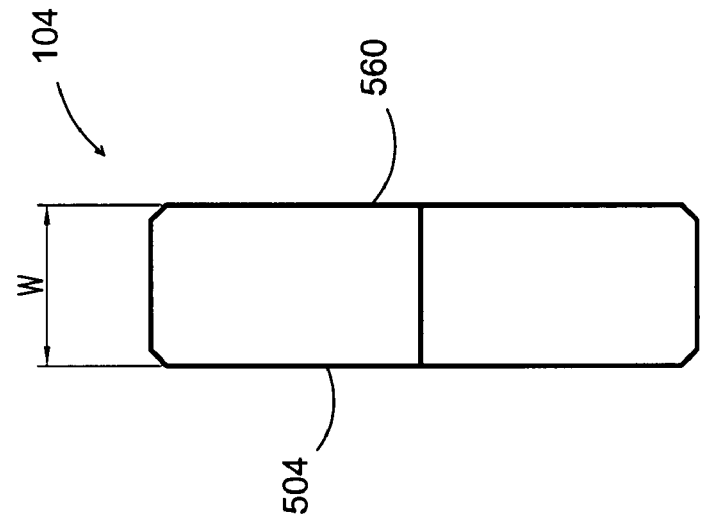
FIG. 6B is a side elevational view of the ferrite core of FIG. 5A.
Figure 6A:
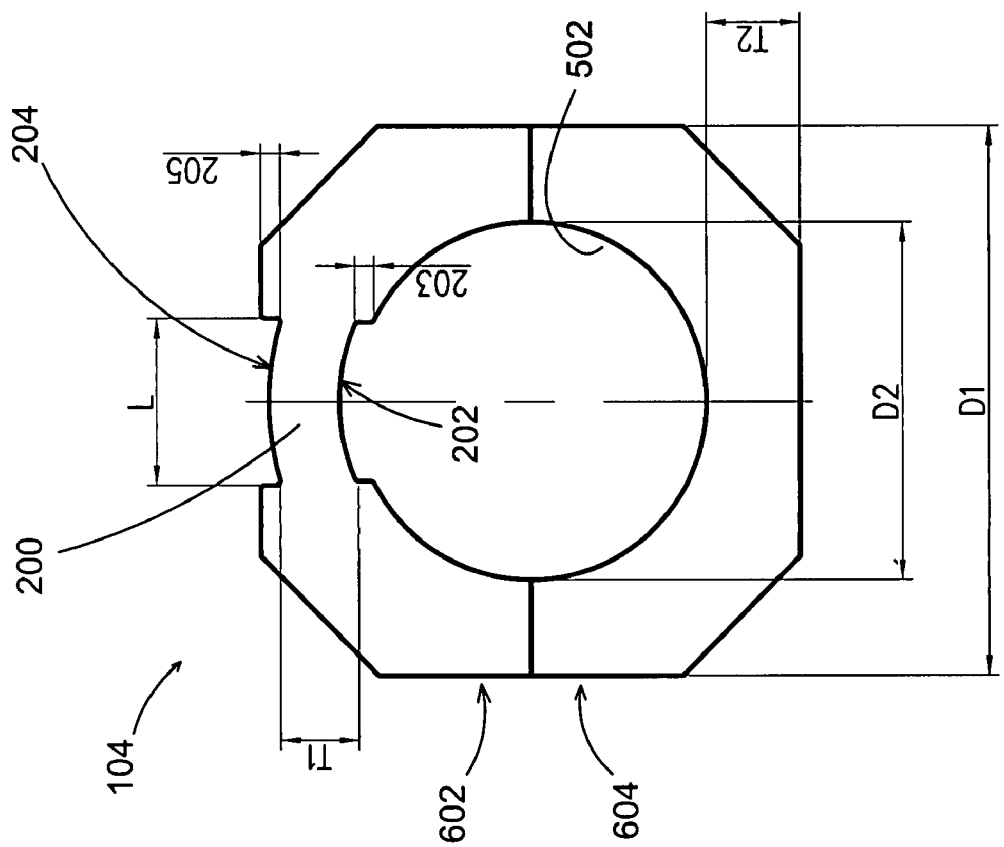
FIG. 6A is a front elevational view of the ferrite core of FIG. 5A.

Preferred dimensions of an embodiment of the ferrite core 104 are described with reference to FIGS. 6A and 6B. In an embodiment, an outer diameter D1 of the core 104 is preferably in a range from 2.5 inches to 3.0 inches, and more preferably in a range from 2.7 inches to 2.75 inches. In an embodiment, an inner diameter D2 of the core 104 is preferably in a range from 1.7 inches to 1.85 inches, and more preferably in a range from 1.75 inches to 1.80 inches. In an embodiment, a width W of the core 104 is preferably in a range from 0.70 inch to 0.88 inch, and more preferably in a range from 0.75 inch to 0.83 inch.

In an embodiment, the indented coil winding section 200 is defined by at least a lower indented portion 202 that is sized to retain the induction coil 108 wound around the perimeter thereof such that an outer-most edge of the coil winding does not extend beyond an edge defined by the centrally located opening 502 of the core 104. In an embodiment, a depth 203 of the lower indented portion 202 of the coil winding section 200 is preferably in a range from 0.05 inch to 0.09 inch, and more preferably in a rage from 0.06 inch to 0.08 inch. In an embodiment, a depth 205 of the upper indented portion 204 of the coil winding section 200 is preferably in a range from 0.05 inch to 0.09 inch, and more preferably in a rage from 0.06 inch to 0.08 inch. In an embodiment, a thickness Ti of the coil winding section 200 is preferably in a range from 0.30 inch to 0.42 inch, and more preferably in a range from 0.34 inch to 0.38 inch. In an embodiment, a length L of the coil winding section 200 is preferably in a range from 0.75 inch to 0.92 inch, and more preferably in a range from 0.80 inch to 0.86 inch.

In general, one advantage of using electrodeless lamps is that they tend to have relatively long service lives when compared to electrode type lamps. Although electrodeless lamps generally tend to be more expensive than electrode type lamps, the additional cost associated with using electrodeless lamps is justified in cases where the cost and effort associated with installing and replacing the lamps is high. For example, with respect to light sources used by high bay light fixtures to provide lighting in high-ceiling areas such as industrial manufacturing areas, warehouses, assembly areas, gymnasiums, hangars, transportation garages and the like, because they are typically located at elevations that are not easily accessible, the cost and effort associated with installing and replacing the lamps in high. In particular, in certain cases, lift devices may need to be employed to position a user within arms reach from a high bay light fixture so as to enable performance of lamp replacement and other light fixture related maintenance services. The need to use the lift devices to perform lamp replacement or high bay light fixture repairs can significantly add to the time and cost required to accomplish such services. Accordingly, in such situations, an overall service life of a lamp is significant consideration when selecting a light source for used with for example, high bay light fixtures, among the various commercially available lamps.

In accordance with an embodiment, the indented coil winding section 200 formed in the core 104 for use with electrodeless lamp envelope 102 is intended to increase an overall service life of the electrodeless lamp.

In conventional electrodeless lamps, because, when the lamp envelope assembly is powered via the ballast circuit, the lamp envelope generates a significant amount of heat causing the induction coil and the insulating layer of the coil to increase in temperature. Over time, in conventional electrodeless lamps, the insulating layer of the induction coil can deteriorate (e.g., dry and crack) resulting from the temperature increase over a long period of time. The deterioration of the insulating layer of the coil may reduce the overall service life of the electrodeless lamp.

To prevent or at least mitigate the problem associated with the insulating layer of the induction coil from deteriorating caused by heat from the lamp envelope, the indented coil winding section 200 of the core 104 is adapted to reduce or eliminate the outer insulating layer of the induction coil from directly contacting the lamp envelope 102, thereby reducing the adverse effect from the heat generated by the lamp envelope.

Figure 7:
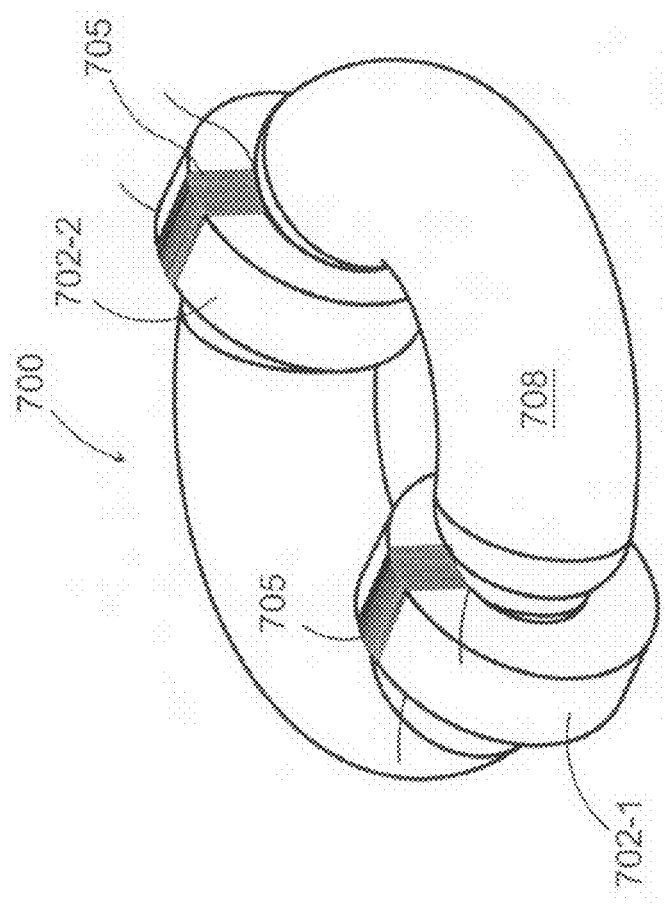
FIG. 7 is a diagrammatic perspective view of a conventional lamp envelope assembly.

In contrast to embodiments of the present invention, cores 702-1, 702-2 of a conventional electrodeless lamp 700 does not have an indented coil winding section, as shown in FIG. 7. As a result, the insulating layer of the induction coil 705 of the conventional electrodeless lamp 700 is typically in direct contact with the lamp envelope 708. As noted above, one drawback with such conventional electrodeless lamp 700 is that the outer insulating layer of the coil 705 tends to deteriorate over time caused by the heat generated by the lamp envelope 708. Consequently, in certain cases, the deterioration of the insulating layer of the induction coil 705 may reduce the service lives of such conventional electrodeless lamps.

In an alternative embodiment, a heat insulating member is disposed between an induction coil wound around a core and a lamp envelope to reduce an amount of heat being transferred from the lamp envelope to the induction coil. By doing so, the probability of the induction coil deteriorating to reduce the service life of the electrodeless lamp is minimized.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. An electrodeless lamp assembly comprising:
   a lamp envelope;
   a core disposed so as to surround a portion of the lamp envelope, the core having an indented coil winding section; and
   an induction coil wound around the indented coil winding section of the core,
   wherein the indented coil winding section is defined by a lower indentation portion formed in an inner side section adjacent to a centrally located opening, and
   wherein a depth of the lower indentation portion of the coil winding section is in a range from 0.05 inches to 0.09 inches.

2. The electrodeless lamp assembly of claim 1, wherein the lamp envelope is a tubular lamp envelope shaped in a closed loop, and wherein the core is a closed-loop body comprising two separate parts mounted together to encircle the tubular lamp envelope at a first core mounting location.

3. The electrodeless lamp assembly of claim 2, wherein the indented coil winding section has a thickness that is smaller than a thickness of a remaining section of the closed-loop body of the core.

4. The electrodeless lamp assembly of claim 2, wherein the closed-loop body of the core includes a polygonal-shaped periphery, and a centrally located opening shaped and sized to engage the core mounting location of the lamp envelope.

5. The electrodeless lamp assembly of claim 2, further comprising:
   a second core having a closed-loop body disposed so as to encircle the tubular lamp envelope at a second core mounting location, the second core having an indented coil winding section,
   wherein the first core mounting location and the second core mounting location of the lamp envelope are located on opposite sides of the tubular lamp envelope.

6. The electrodeless lamp assembly of claim 1, wherein the indented coil winding section is further defined by an upper indentation portion formed in an outer periphery section opposite the lower indented portion.

7. The electrodeless lamp assembly of claim 6, wherein a depth of the upper indentation portion of the coil winding section is in a range from 0.05 inches to 0.09 inches.

8. The electrodeless lamp assembly of claim 1, wherein the lower indentation portion is configured to retain the induction coil wound around an outer perimeter of the coil winding section such that an outer-most edge of coil winding does not extend beyond an edge defined by a centrally located opening of the core.

9. The electrodeless lamp assembly of claim 1, wherein the lower indentation portion of the coil winding section is configured such that an insulating layer of the induction coil is prevented from making direct contact with the tubular lamp envelope when the core with the induction coil wound around the indented coil winding section is mounted on the tubular lamp envelope.

10. The electrodeless lamp assembly of claim 1, further comprising a ballast circuit coupled to the induction coil wound around the core.

11. A core for use with a tubular electrodeless lamp envelope, the core comprising a closed-loop body including a centrally located opening to surround a portion of the tubular electrodeless lamp envelope, the closed-loop body having an indented coil winding section, wherein the indented coil winding section is defined by a lower indented portion, and wherein a depth of the lower indented portion of the coil winding section is in a range from 0.05 inches to 0.09 inches.

12. The core of claim 11, wherein the indented coil winding section has a thickness that is smaller than a thickness of a remaining section of the closed-loop body of the core.

13. The core of claim 11, wherein the indented coil winding section is further defined by an upper indented portion.

14. The core of claim 13, wherein a depth of the upper indented portion of the coil winding section is in a range from 0.05 inches to 0.09 inches.

15. The core of claim 11, wherein the lower indented portion is sized to retain an induction coil wound around an outer perimeter of the coil winding section such that an outer-most edge of coil winding does not extend beyond an edge defined by a centrally located opening of the core.

16. The core of claim 11, wherein the lower indented portion of the coil winding section is configured such that an insulating layer of an induction coil is prevented from making direct contact with the tubular lamp envelope when the core with the induction coil wound around the indented coil winding section is mounted on the tubular lamp envelope.

17. The core of claim 11, wherein the closed-loop body is defined by a first planar surface and a second planar surface opposite the first planar surface to define an axial thickness, and the centrally located opening extends between the first planar surface and the second planar surface.

18. The core of claim 17, wherein the lower indented portion is formed by an indentation formed in an inner side section adjacent to the centrally located opening, the indentation extending between the first planar surface and the second planar surface of the closed-loop body.

19. The core of claim 18, wherein the indented coil winding section is further defined by an upper indented portion formed by an indentation formed in an outer periphery section of the closed-loop body opposite the lower indented portion.

20. The core of claim 11, wherein the closed-loop body of the core includes a polygonal-shaped periphery, and a centrally located opening sized to firmly engage a core mounting location of the lamp envelope.

21. A method comprising:
  winding an induction coil around an indented coil winding section of a core; and
  mounting the core on an electrodeless lamp tube such that the core surrounds a portion of the lamp envelope,
  wherein the indented coil winding section is defined by a lower indented portion that is sized to retain the induction coil wound around an outer perimeter of the coil winding section such that an outer-most edge of coil winding does not extend beyond an edge defined by a centrally located opening of the core.

22. The method of claim 21, further comprising disposing a heat insulating member between the induction coil wound around the indented coil winding section of the core and the lamp envelope.

23. The method of claim 21, further comprising:
  coupling a ballast circuit to the induction coil wound around the core; and
  driving the induction coil wound around the core with high frequency current to produce inductive electromagnetic fields to excite discharge as contained in the lamp envelope.

* * * * *